(12) United States Patent
Viswanadham et al.

(10) Patent No.: US 9,699,593 B2
(45) Date of Patent: Jul. 4, 2017

(54) SCANNING ENHANCEMENTS FOR SHORT-RANGE WIRELESS DEVICES

(71) Applicant: Google Inc., Mountain View, CA (US)

(72) Inventors: Prerepa V. Viswanadham, Fremont, CA (US); Wei Wang, San Carlos, CA (US)

(73) Assignee: Google Inc., Mountain View, CA (US)

( * ) Notice: Subject to any disclaimer, the term of this patent is extended or adjusted under 35 U.S.C. 154(b) by 275 days.

(21) Appl. No.: 14/508,778

(22) Filed: Oct. 7, 2014

(65) Prior Publication Data

US 2016/0100276 A1    Apr. 7, 2016

(51) Int. Cl.
*H04W 4/00*    (2009.01)
*H04W 8/00*    (2009.01)

(52) U.S. Cl.
CPC .......... *H04W 4/008* (2013.01); *H04W 8/005* (2013.01)

(58) Field of Classification Search
CPC .............................. H04W 4/008; H04W 8/005
See application file for complete search history.

(56) References Cited

U.S. PATENT DOCUMENTS

| | | | |
|---|---|---|---|
| 8,437,776 B2 | 5/2013 | Busch | |
| 8,737,917 B2 | 5/2014 | Desai et al. | |
| 8,989,053 B1* | 3/2015 | Skaaksrud | H04W 12/06 370/255 |
| 2013/0040574 A1 | 2/2013 | Hillyard | |
| 2013/0090061 A1* | 4/2013 | Linde | H04W 8/005 455/41.2 |
| 2013/0165044 A1 | 6/2013 | Xie et al. | |
| 2014/0355582 A1* | 12/2014 | Kamath | H04W 84/20 370/338 |
| 2015/0271625 A1* | 9/2015 | Chen | H04W 4/008 370/328 |
| 2015/0349917 A1* | 12/2015 | Skaaksrud | G06Q 10/0833 370/328 |

\* cited by examiner

*Primary Examiner* — Lewis West
(74) *Attorney, Agent, or Firm* — McDonnell Boehnen Hulbert

(57) ABSTRACT

Methods and systems for storing data regarding received advertising packets are disclosed. An example method involves determining parameters of at least one batch-scan mode for a Bluetooth device. The parameters of the at least one batch-scan mode specify a format for storing data regarding particular advertising packets that are received by the Bluetooth device when operating in the at least one batch-scan mode. The method also involves receiving, by the Bluetooth device, one or more advertising packets on an interval basis. Further, the method involves storing data regarding the one or more advertising packets into a memory of the Bluetooth device in accordance with the at least one batch-scan mode. And the method involves providing the stored data regarding the one or more advertising packets to the host Bluetooth stack.

20 Claims, 8 Drawing Sheets

500A

| | |
|---|---|
| BATCH-SCAN MODE: | TRUNCATED MODE |
| SCAN INTERVAL: | 120 s |
| SCAN WINDOW LENGTH: | 100 MS |
| SCAN DISCARD RULE: | DISCARD OLDEST ADV. PACKET |
| STORAGE SPACE: | 45 % |
| NOTIFICATION THRESHOLD: | 90 % |
| SCAN REQUEST: | NO |
| DATA FIELDS: | DEVICE ADDRESS; TX POWER; RSSI; TIMESTAMP |

| | |
|---|---|
| BATCH-SCAN MODE: | FULL MODE |
| SCAN INTERVAL: | 30 s |
| SCAN WINDOW LENGTH: | 100 MS |
| SCAN DISCARD RULE: | DISCARD ADV. PACKET WITH WEAKEST RSSI |
| STORAGE SPACE: | 50 % |
| NOTIFICATION THRESHOLD: | 90 % |
| SCAN REQUEST: | YES |
| DATA FIELDS: | DEVICE ADDRESS; TX POWER; RSSI; TIMESTAMP; ADV. PACKET; SCAN RESPONSE PACKET |

FIGURE 5B

SCANNING ENHANCEMENTS FOR SHORT-RANGE WIRELESS DEVICES

BACKGROUND

Unless otherwise indicated herein, the materials described in this section are not prior art to the claims in this application and are not admitted to be prior art by inclusion in this section.

Portable computing devices such as personal computers, laptop computers, tablet computers, smart phones, wearable computers, and countless types of Internet-capable devices are prevalent in numerous aspects of modern life. For example, it is common for a single consumer to operate a smart phone, a laptop computer, a keyboard, and a mouse, possibly simultaneously. With increasing consumers of multiple portable devices, the demand for wireless technology continues to play a role in the use of such portable devices. As such, various forms of wireless technology have evolved to locally connect these portable devices for numerous applications. One short-range wireless technology standard for exchanging data between multiple portable devices is popularly known as Bluetooth.

Bluetooth is commonly used for wirelessly connecting a portable device with one or more other portable devices over a short range. For example, Bluetooth may be used to connect a cell phone to a wireless headset, possibly allowing for hands-free use of the phone. In some instances, Bluetooth may also be used to connect the cell phone to the audio speakers and a microphone of a motor vehicle, possibly allowing for hands-free use of the phone while operating the vehicle. In multiple applications, Bluetooth remains particularly attractive due to its low-cost solutions and protocols designed for low power consumption.

Bluetooth low energy (Bluetooth LE or BLE, sometimes referred to as Bluetooth Smart) is an extension of the Bluetooth standard that was merged into the Bluetooth standard in 2010. The BLE standard also enables radio frequency communication between various types of devices, and is aimed at novel applications in the healthcare, fitness, security, and home entertainment industries. As the name implies, the BLE standard is intended to provide considerably reduced power consumption and cost as compared to the original Bluetooth standard. For example, the BLE standard is designed to enable wireless connectivity with small devices running on a watch battery or button cell.

One particular portion of the BLE standard is the advertiser/scanner model that allows a device to discover nearby devices, broadcast information for discovery by nearby devices, or form a connection with another device. The BLE standard provides for forty physical channels operating within the 2.4 GHz Industrial, Scientific, & Medical (ISM) band. Three of the channels are designated for use as advertising channels, while the remaining thirty-seven channels are designated for use as data channels. Bluetooth devices may transmit and receive data in packets on the advertising channels using a Frequency Division Multiple Access (FDMA) scheme. Devices that transmit data packets on the advertising channels are referred to as "advertisers". And devices that receive data packets on the channels are referred to as "scanners".

SUMMARY

Embodiments of the present disclosure are related to systems and methods for storing data regarding advertising packets that are received by a device from an advertising short-range wireless communication (e.g., Bluetooth) device. For example, embodiments of the present disclosure may allow a Bluetooth controller of a device to autonomously and temporarily store data regarding advertising packets for subsequent delivery to a host processor of the device. As described herein, in some examples, a Bluetooth device may store data regarding advertising packets that are received by the Bluetooth device in accordance with two different batch-scan modes that can be engaged simultaneously. For instance, a Bluetooth device may be configured to store data regarding advertising packets using a truncated mode having a first format and to store data using a full mode having a second format that includes more data fields than the first format.

In one example aspect, a method is provided that involves determining parameters of at least one batch-scan mode for a Bluetooth device. The parameters of the at least one batch-scan mode specify a format for storing data regarding particular advertising packets that are received by the Bluetooth device when operating in the at least one batch-scan mode. The method also involves receiving, by the Bluetooth device, one or more advertising packets on an interval basis. Further, the method involves storing data regarding the one or more advertising packets into a memory of the Bluetooth device in accordance with the at least one batch-scan mode. And the method involves providing the stored data regarding the one or more advertising packets to a host Bluetooth stack.

In another example aspect, a Bluetooth device that includes one or more processors and a computer-readable medium is provided. The computer-readable medium is configured to store instructions, that when executed by the one or more processors of the Bluetooth device, cause the Bluetooth device to perform functions. The functions include determining parameters of at least one batch-scan mode. The parameters of the at least one batch-scan mode specify a format for storing data regarding particular advertising packets that are received by the Bluetooth device when operating in the at least one batch-scan mode. The functions also include receiving one or more advertising packets on an interval basis. Additionally, the functions include storing data regarding the one or more advertising packets into a memory of the Bluetooth device in accordance with the at least one batch-scan mode. And the functions include providing the stored data regarding the one or more advertising packets to a host Bluetooth stack.

In still another example aspect, a non-transitory computer-readable medium having stored therein instructions, that when executed by one or more processors of a Bluetooth device cause the Bluetooth device to perform functions is provided. The functions include determining parameters of at least one batch-scan mode. The parameters of the at least one batch-scan mode specify a format for storing data regarding particular advertising packets that are received by the Bluetooth device when operating in the at least one batch-scan mode. The functions also include receiving one or more advertising packets on an interval basis. Additionally, the functions include storing data regarding the one or more advertising packets into a memory of the Bluetooth device in accordance with the at least one batch-scan mode. And the functions include providing the stored data regarding the one or more advertising packets to a host Bluetooth stack.

In yet another example aspect, a Bluetooth device is provided that includes means for determining parameters of at least one batch-scan mode. The parameters of the at least one batch-scan mode specify a format for storing data regarding particular advertising packets that are received by a Bluetooth device when operating in the at least one batch-scan mode. The Bluetooth device also includes means for receiving one or more advertising packets on an interval basis. Further, the Bluetooth device includes means for storing data regarding the one or more advertising packets into a memory of the Bluetooth device in accordance with the at least one batch-scan mode. And the Bluetooth device includes means for providing the stored data regarding the one or more advertising packets to a host Bluetooth stack.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIGS. 5A and 5B are conceptual illustrations of example batch-scan modes.

DETAILED DESCRIPTION

Figure 1:
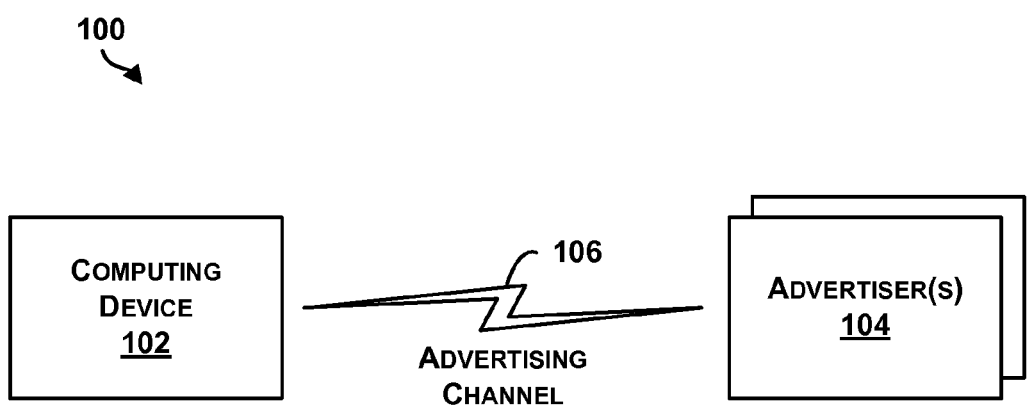
FIG. 1 illustrates an example wireless communication system.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for storing data regarding advertising packets that are received by a device from an advertising short-range wireless communication (e.g., Bluetooth) device. For example, embodiments of the present disclosure may allow a Bluetooth device to autonomously and temporarily store data regarding advertising packets for subsequent delivery to a host Bluetooth stack. One example of an advertising packet is a data packet transmitted by an advertiser as described in the BLE protocol.

In some instances, the methods and systems described herein may enhance how notifications of received advertising packets are delivered to the host Bluetooth stack. By way of example, a device may reduce power consumption by configuring a Bluetooth controller to temporarily store data regarding advertising packets that are received by the device in accordance with one or more batch-scan modes that have been configured by the host processor. As a result, rather than automatically notifying a host processor that implements the host Bluetooth stack whenever an advertising packet is received, the Bluetooth controller may instead store data regarding the received advertising packet in a memory of the Bluetooth controller in accordance with the one or more batch-scan modes. This may help to conserve power by allowing the host processor to remain in a sleep mode or idle mode for longer durations.

An example method may involve determining parameters of at least one batch-scan mode for a Bluetooth device. The parameters of the at least one batch-scan mode may specify a format for storing data regarding particular advertising packets that are received by the Bluetooth device when operating in the at least one batch-scan mode. By way of example, the parameters may specify an interval basis for scanning for advertising packets and/or a scan window length that indicates an amount of time per interval that a Bluetooth controller of the Bluetooth device is configured to scan for advertising packets. As another example, the parameters may specify a portion of a memory of the Bluetooth controller that is allocated for storing the data regarding advertising packets that are received by the Bluetooth device. Other example parameters are also described below. In some instances, the Bluetooth controller may receive one or more commands for configuring the at least one batch-scan mode from a host Bluetooth stack of the Bluetooth device.

Further, the method may involve receiving, by the Bluetooth device, one or more advertising packets on an interval basis. For instance, the Bluetooth controller may scan one or more advertising channels for advertising packets on an interval basis. Additionally, the method may involve the Bluetooth device storing data regarding the one or more advertising packets into a memory of the Bluetooth device in accordance with the at least one batch-scan mode. By way of example, the at least one batch-scan mode may include a truncated mode in which, for each of the one or more advertising packets, the Bluetooth device stores data indicative of a device address, transmit power, and received signal strength indication (RSSI). Alternatively or additionally, the batch-scan mode may include a full mode in which the Bluetooth device is configured to store additional data for each of the one or more advertising packets, such as advertisement data of the advertising packet.

Furthermore, the method may involve providing the stored data regarding the one or more advertising packets to a host Bluetooth stack. By way of example, one or more steps of the method may be carried out by a Bluetooth controller of the Bluetooth device, and the Bluetooth controller may provide the stored data to a host processor that implements the host Bluetooth stack using a host-controller interface. In some instances, the Bluetooth device may provide the stored data to the host Bluetooth stack in response to receiving a read-request from the host processor. Various additional example implementations of the methods and systems are described below with reference to the figures.

Additionally, although portions of the present disclosure focus on the BLE protocol to help illustrate features of the methods and systems, the examples are not meant to be limiting. Those of ordinary skill in the art will readily appreciate that the disclosed principles can be applied as well in other types of short-range wireless communication systems, with variations where appropriate. For instance, the described methods and systems may be applicable to other short-range wireless communication systems in which advertising devices broadcast data packets for receipt by a device having a short-range wireless communication module.

Referring now to the figures, FIG. 1 illustrates an example wireless communication system 100. As shown in FIG. 1, the wireless communication system 100 includes a computing device 102 and one or more advertisers 104 that may communicate with the computing device over an advertising channel 106. In one example, the wireless communication system 100 may be a BLE system operable to utilize an FDMA scheme and a time division multiple access (TDMA) scheme to support voice and/or data communication. For example, the wireless communication system 100 can be configured to divide a plurality of physical channels, for example, forty physical channels, into advertising channels and data channels per FDMA scheme. In advertising channels, a BLE device, such as the computing device 100 or an advertiser 104, can then function as an advertiser, scanner, and/or initiator. In data channels, a BLE device can play a role as a master or a slave. For instance, the BLE system can be enabled to utilize a TDMA based polling scheme in link layer communications between a master device and a slave device.

An advertiser, such as the advertiser 104, can comprise any device acting in an advertiser role according to the BLE standard or another related short-range wireless communication standard. For example, advertiser 104 may be a device with temperature sensors that broadcasts temperature data that can be received and read by a device within communication range of the advertiser 104. As another example, advertiser 104 may be a device that broadcasts product or promotional information to scanner devices in a retail establishment. Accordingly, advertiser 104 can include suitable logic, circuitry, and/or code that can be enabled to broadcast advertisement packets periodically in advertising channels, such as the advertising channel 106. Advertiser 104 may be configured to advertise service and/or availability for a link layer connection. For instance, advertiser 104 may be configured to transmit advertising packets within advertising events in accordance with the BLE protocol.

The computing device 102 may be any type of device acting in a scanner role according to the BLE standard or another related short-range wireless communication standard. For instance, the computing device may be a scanner device operable to search for advertising packets from BLE advertisers, such as advertiser 104. By way of example, the computing device 102 may be a mobile phone, desktop computer, laptop computer, tablet computer, wearable computer, or other type of computing device configured to scan for advertising packets. Accordingly, computing device 102 may include suitable logic, circuitry, and/or code that may be operable to search for advertising packets from advertising BLE devices.

Further, computing device 102 may be configured to perform a passive scan or an active scan. In a passive scan, the computing device 102 may be enabled to listen for advertising packets and may not transmit messages to advertisers. On the other hand, in an active scan, the computing device 102 may request an advertiser to transmit additional information that may not be available in the received advertising packets. For instance, in accordance with the BLE standard, the computing device 102 may transmit a scan request packet to a BLE advertiser. In response to receiving the scan request packet, the BLE advertiser may then respond by transmitting a scan response packet to the computing device 102.

Figure 2:
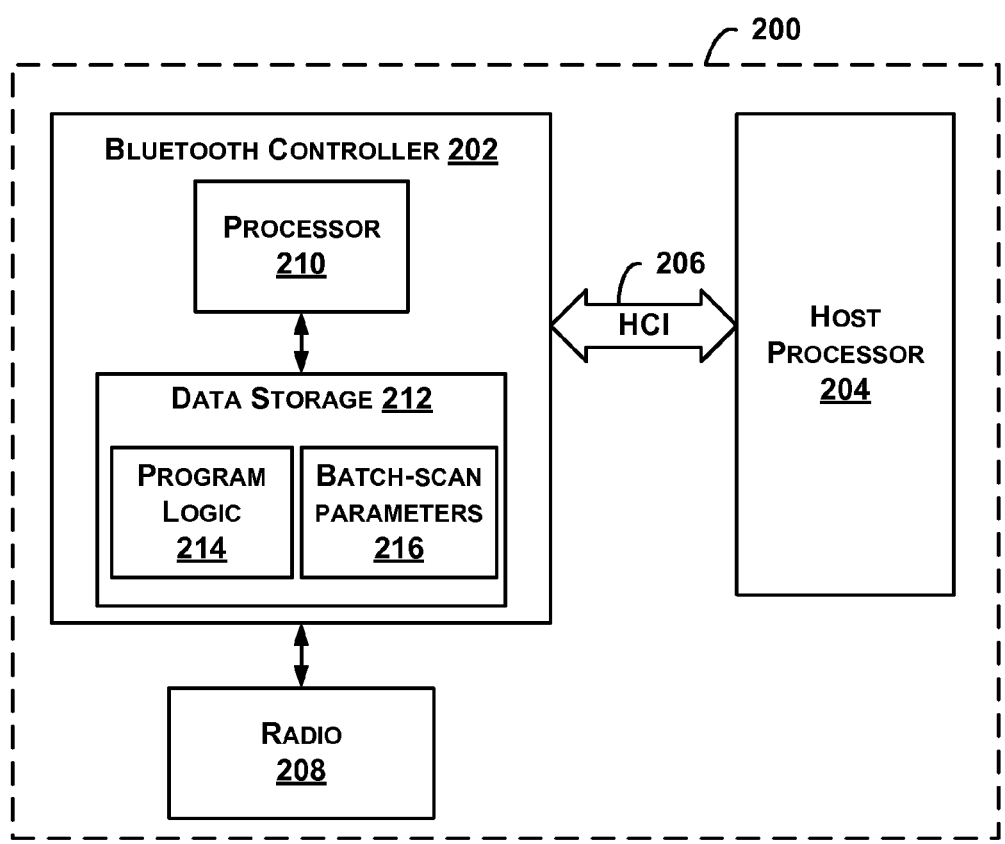
FIG. 2 illustrates a schematic drawing of an example computing device.

FIG. 2 illustrates a schematic drawing of an example computing device 200. In some instances, computing device 200 may, for example, take the form of any computing device described above in relation to FIG. 1 or a similar device that may be configured to perform the methods and functions described herein. In this example, computing device 200 includes a Bluetooth controller 202 configured to communicate with a host processor 204 via a host-controller interface (HCI) 206. Further, the computing device 200 includes a radio 208.

The Bluetooth controller 202 can be any suitable logic, circuitry, interfaces, and/or code that facilitates transmission and/or receiving signals over a BLE air interface. For instance, the signals may include advertising packets, scan request packets, or scan response packets transmitted or received over one or more advertising channels. By way of example, Bluetooth controller 202 includes a processor 210 and data storage 212. Processor 210 may be a baseband processor, for instance, and can include one or more central processing units (CPUs), such as one or more general purpose processors and/or one or more dedicated processors (e.g., application specific integrated circuits, digital signal processors, network processors, etc.). Further, processor 210 may execute firmware associated with operation of the Bluetooth controller 202 for managing and/or providing support for link management functionality for the Bluetooth controller 202. Firmware executed by the processor 210 can also facilitate communication with the host processor 204 via the HCI 206. In some instances, the Bluetooth controller 202 may be a Bluetooth module or BLE module of a device.

Data storage 212, in turn, may include volatile and/or non-volatile data storage and can be integrated in whole or in part with processor 210. Data storage 212 can hold program logic 214 executable by processor 210, and data that may be manipulated to carry out the various methods, processes, or functions described herein. Alternatively, these methods, processors, or functions can be defined by hardware, firmware, and/or any combination of hardware, firmware, and software. By way of example, the program logic 214 may include program instructions, perhaps stored on a non-transitory, computer-readable medium, executable by the processor 210 to carry out any of the methods, processes, or functions disclosed in this specification or the accompanying drawings. In line with the discussion above, data storage 212 may further include batch-scan parameters 216 for one or more batch-scan modes.

Host processor 204 may include one or more central processing units (CPUs), such as one or more general purpose processors and/or one or more dedicated processors (e.g., application specific integrated circuits, digital signal processors, network processors, etc.). In one example, host processor 204 may be configured to implement one or more upper layers of a Bluetooth stack in accordance with the BLE protocol. As described herein, the upper layers of the Bluetooth stack (e.g., L2CAP, RFCOMM, OBEX, and selected profiles) may be referred to as the host Bluetooth stack or Bluetooth host stack. In some instances, host processor 204 may be a main application processor of the computing device 200, for instance, and may implement the host Bluetooth stack. Alternatively, the host processor 204 or the processor 210 may be omitted, and functions of the host Bluetooth stack and Bluetooth controller 202 may be implemented by a single processor or multi-processor core (not shown).

The HCI 206 may be implemented using one or more of several different hardware interfaces, such as universal synchronous receiver/transmitter (UART), serial peripheral interface bus (SPI), universal serial bus (USB) interface, peripheral component interconnect (PCI), or any other suitable hardware interface.

The radio 208 may be a receiver or transceiver that includes suitable logic and/or circuitry to facilitate transmission and/or receiving of wireless signals in accordance with the BLE protocol or any related advertising protocols.

In some embodiments, the computing device 200 may include a device platform or operating system (not shown). The device platform or the operating system may be compatible with Bluetooth or BLE protocols, or other short-range wireless communication protocols. Additionally, in some instances, the device platform or the operating system may be configured as a multi-layered Linux platform or operating system. The device platform may include different applications and an application framework, as well as various kernels, libraries, and runtime entities. In other examples, other formats or systems may operate the computing device 200 as well.

Figure 3:
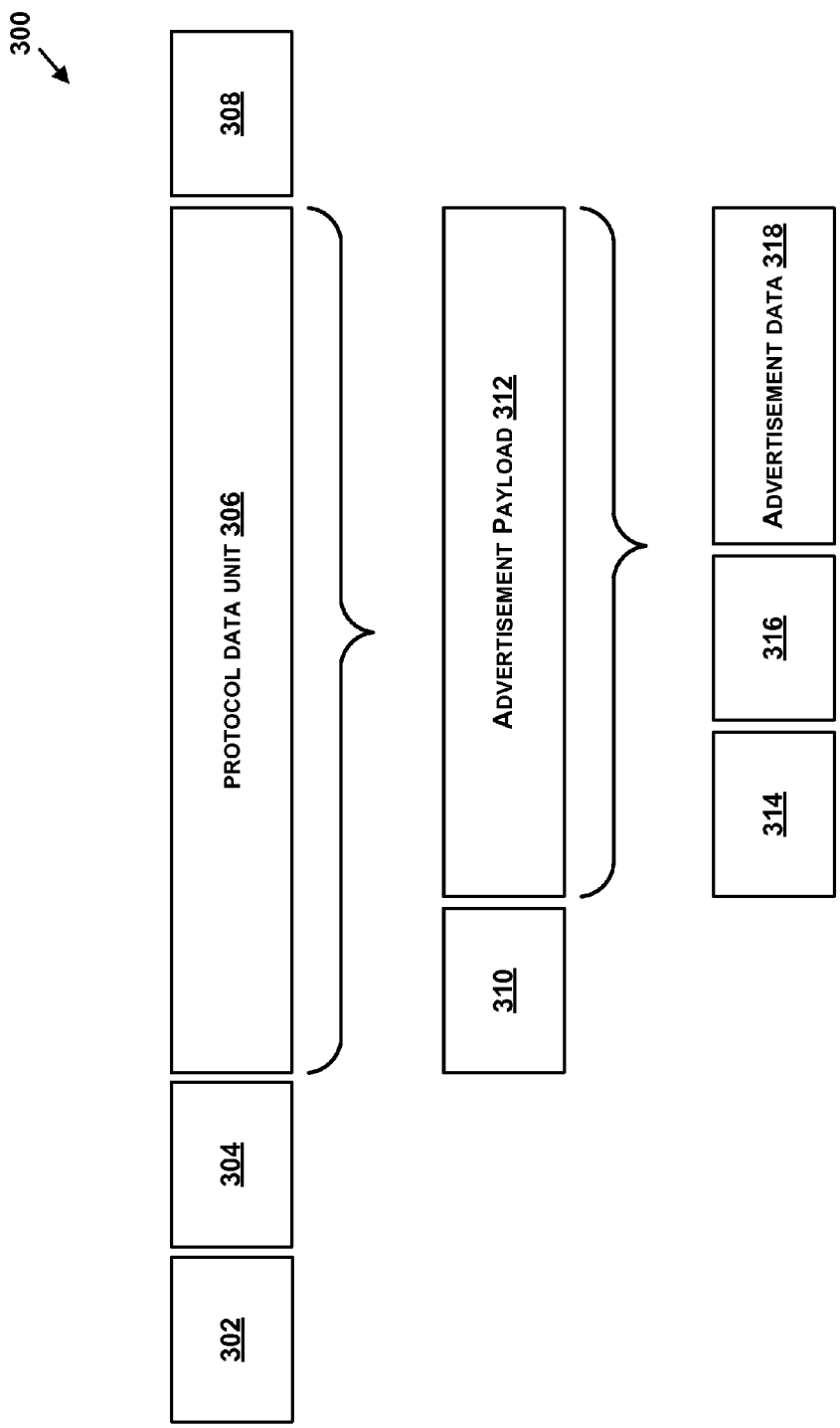
FIG. 3 illustrates an example data packet structure.

In line with the discussion above, in some examples, computing device may receive one or more data packets, such as an advertising packet and/or scan response packet, from an advertising Bluetooth device. FIG. 3 illustrates an example data packet structure 300. In particular, data packet structure 300, may, for example, represent the form of any data packets described above in relation to FIGS. 1 and 2, such as an advertisement packet or a scan response packet.

As shown in FIG. 3, a data packet may include preamble 302, access address 304, protocol data unit 306 with two to thirty-nine bytes, and error checking data 308. Protocol data unit 306 may, in turn, include header 310 and a variable-size advertisement payload 312. Further, advertisement payload 312 may include header 314, device identifier 316, and advertisement data 318.

Device identifier 316 may include an address of the advertising device that transmitted the data packet. In other words, device identifier 316 may be a broadcaster address. For instance, the broadcaster address may be a MAC address or other unique device identifier.

Advertisement data 320 may include various types of data defined according to the BLE standard. For instance, advertisement data 320 may include one or any combination of: a service universally unique identifier (UUID), a service solicitation UUID, a local name, manufacturer specific data, and service data. A service UUID or service solicitation UUID may identify one or more service types associated with an advertiser (e.g., temperature data, promotional information, health information, location information, etc.). Accordingly, a service UUID or service solicitation UUID may function to let other devices know which services are provided by an advertiser. Further service data may be the data corresponding to the service. For instance, if the service type is temperature, the service data may be a temperature reading. A local name may be a partial or complete user-readable local name that is a UTF-8 encoded string. Manufacturer specific data may include a company identifier as well as any other type of data defined according to a format specified by the identified company.

Figure 4:
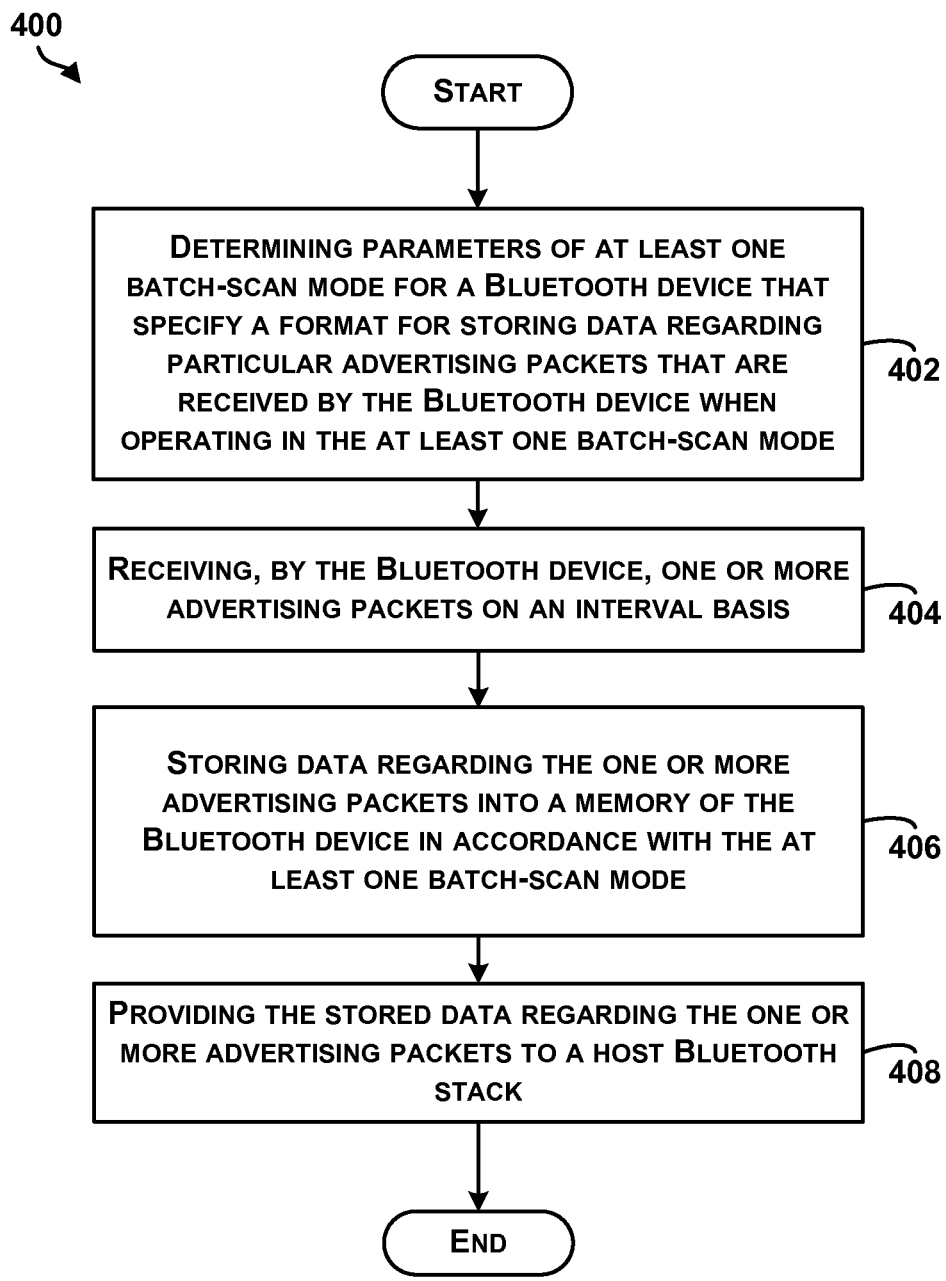
FIG. 4 is a block diagram of an example method for storing data regarding received advertising packets.

Referring now to FIG. 4, FIG. 4 is a block diagram of an example method 400 for storing data regarding received advertising packets. Method 400 shown in FIG. 4 presents an embodiment of a method that could be performed by the computing device 100 of FIG. 1, for example, or by any computing device. More specifically, method 400 presents an embodiment that could be performed by one or more processors of a Bluetooth controller of a computing device and/or one or more application processors of a computing device. Method 400 may include one or more operations, functions, or actions as illustrated by one or more of blocks 402-408. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 400 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and random access memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 400 and other processes and methods disclosed herein, each block in FIG. 4 may represent circuitry that is wired to perform the specific logical functions in the process.

Initially, at block 402, the method 400 includes determining parameters of at least one batch-scan mode for a Bluetooth device. The parameters of the at least one batch-scan mode may specify a format for storing data regarding particular advertising packets that are received by the Bluetooth device when operating in the at least one batch-scan mode. Generally, a parameter of a batch-scan mode may include a reference or value that is passed to a function, procedure, subroutine, command, or program, to facilitate operating in the batch-scan mode.

As one example, the parameters may specify an interval period for scanning for advertising packets on one or more advertising channels. For instance, the interval period may be a number of milliseconds, seconds, or minutes. If the interval period for a particular batch-scan mode is 30 minutes, for example, when operating in the particular batch-scan mode, the Bluetooth controller may scan for advertising packets every 30 minutes.

As another example, the parameters may specify a scan window length that specifies an amount of time per interval that the Bluetooth controller scans for advertising packets on one or more advertising channels. For instance, the scan window length may be a number of milliseconds. If the scan window length for a particular batch-scan mode is 100 milliseconds, for example, when operating in the particular batch-scan mode, the Bluetooth controller may scan for advertising packets during a 100-millisecond window of time.

As still another example, the parameters may specify a portion of memory that is allocated for storing data regarding advertising packets that are received by the Bluetooth device. For instance, the portion of memory may be a percentage of a memory of the Bluetooth controller that is allocated for storing the data, or a number of bytes that are allocated for storing the data. In some instances, the parameters may specify a portion of memory that is allocated for storing data in a particular batch-scan mode or multiple batch-scan modes. By way of example, the parameters may specify that 45% of a memory is allocated for storing data in a first batch-scan mode and 35% of a memory is allocated for storing data in a second batch-scan mode.

As yet another example, the parameters may specify a memory-notification threshold that triggers a notification to the host Bluetooth stack based on amount of space consumed or remaining in the memory. For instance, the memory-notification threshold may be a percentage. If the memory-notification threshold is set to 85%, the Bluetooth controller may provide a notification to the host Bluetooth stack that the memory is 85% full when the memory is 85% full. In one instance, setting the memory-notification threshold to 0 may disable the memory-notification feature.

As a further example, the parameters may specify a discard rule for a particular batch-scan mode. By way of example, the discard rule may indicate which data should be deleted when a memory of the Bluetooth controller is full. In one instance, the discard rule may indicate that the Bluetooth controller is configured to delete data corresponding to the oldest advertising packet. In another instance, the discard rule may indicate that the Bluetooth controller is configured to delete data corresponding to the advertising packet having the weakest RSSI.

As still another example, the parameters may specify whether or not to perform a scan request in response to receiving an advertising packet. For instance, if a scan response feature is enabled, the Bluetooth controller may be configured to send a scan request in response to receiving an advertising packet. However, if the scan request feature is disabled, the Bluetooth controller may not send a scan request in response to receiving an advertising packet.

The parameters of the at least one batch-scan mode may also specify the type of data that should be stored regarding a received advertising packet. For instance, the at least one batch-scan mode may include a truncated mode in which the Bluetooth controller is configured to store data regarding advertising packets in a first format. And the at least one batch-scan mode may also include a full mode in which the Bluetooth controller is configured to store data regarding advertising packets in a second format that includes more data than the truncated mode.

As a particular example, in the truncated mode, for one or more advertising packets, the Bluetooth controller may store data indicative of a respective device address, respective transmit power, and respective RSSI. Meanwhile, in the full mode, for one or more advertising packets, the Bluetooth controller may store data indicative of a respective device address, respective transmit power, respective RSSI, and the advertising packet.

In one implementation, when operating in a truncated mode, the Bluetooth controller may store a record for every unique device address observed per scan interval. In other words, the records may be indexed by {device address, scan interval}. Accordingly, if multiple advertising packets are received having the same device address during a scan interval, the Bluetooth controller may only store a single record that represents the multiple advertising packets. Further, the record to keep for each device address per scan interval may be {device address, transmit power, RSSI, timestamp}. If multiple advertising packets are received having the same device address within a scan interval, the RSSI may be the average RSSI of the multiple advertising packets.

In another implementation, when operating in a full mode, the Bluetooth controller may be configured to only store a single record when the same advertising packet is observed across multiple scan intervals. In other words, the records may be indexed by {device address, advertising packet}. Further, the record to keep may be {device address, transmit power, RSSI, timestamp, advertising packet}. Or alternatively, if a scan request feature is enabled, the record to keep may be {device address, transmit power, RSSI, timestamp, advertising packet, scan response}. If multiple duplicates of a unique advertising packet are received within a scan interval, the RSSI may be the average RSSI of the multiple advertising packets.

In some examples, determining the parameters of the at least one batch-scan mode may involve receiving one or more commands for configuring the at least one batch-scan mode from a host processor of the Bluetooth device. For instance, the host processor may configure one or more batch-scan modes by providing one or more predetermined operating codes to the Bluetooth controller. Note that in some instances, the host processor may configure multiple batch-scan modes to be engaged in simultaneously. In other examples, determining the parameters of the at least one batch-scan mode may involve reading the parameters from a memory of the Bluetooth controller.

Continuing with the method 400, at block 404, the method 400 includes receiving, by the Bluetooth device, one or more advertising packets on an interval basis. By way of example, the Bluetooth device may be configured to scan one or more advertising channels on an interval basis to detect advertising packets. Accordingly, in one example, the Bluetooth controller may receive advertising packets over a BLE air-interface using a radio of the Bluetooth device. Further, as discussed above, the parameters of the at least one-batch scan mode may specify the interval period for scanning for advertising packets. In some instances, the Bluetooth controller may receive the one or more advertising packets while the host processor is in an idle mode or sleep mode.

At block 406, the method 400 includes storing data regarding the one or more advertising packets into a memory of the Bluetooth device in accordance with the at least one batch-scan mode. In some example, the Bluetooth controller may be configured to store data regarding the one or more advertising packets on the same interval basis with which the Bluetooth controller scans for and receives advertising packets.

In one example, if the Bluetooth controller is configured to operate in a truncated mode, for each advertising packet having a unique device address per interval, the Bluetooth controller may store a record of the device address, transmit power, RSSI, and timestamp. Thus, when operating in the truncated mode, if multiple advertising packets having the same device are received during a scan interval, the Bluetooth controller may be configured to only store a single record of the multiple advertising packets for the scan interval.

Additionally or alternatively, if the Bluetooth controller is configured to operate in a full mode, for each unique advertising packet received across multiple different intervals, the Bluetooth controller may store a record of the device address, transmit power, RSSI, timestamp, advertising packet, and optionally scan response packet. Thus, when operating in the full mode, the Bluetooth controller may be configured to determine whether or not the memory already includes a record of a particular advertising packet. If, for instance, the memory already includes a record of a particular advertising packet, the Bluetooth controller may avoid creating a duplicate record of the particular advertising packet. On the other hand, if the memory does not already include a record of a particular advertising packet, the Bluetooth controller may store a record of the advertising packet in the memory.

And at block 408, the method 400 includes providing the stored data regarding the one or more advertising packets to a host Bluetooth stack. By way of example, the Bluetooth controller may provide the stored data to a host processor, which implements the host Bluetooth stack, over an HCI. In some instances, the Bluetooth controller may provide the stored data in response to receiving a read-request from the host Bluetooth stack.

FIGS. 5A and 5B are conceptual illustrations 500A, 500B of example batch-scan modes. More specifically, FIG. 5A depicts a conceptual illustration 500A of example parameters of a first batch-scan mode and FIG. 5B depicts a conceptual illustration 500B of example parameters of a second batch-scan mode.

As shown in FIG. 5A, the first batch-scan mode may be a truncated mode. The parameters of the truncated mode include a scan interval, scan window length, scan discard rule, storage space, notification threshold, scan request, and data fields. The parameters of the batch-scan mode collectively define when the Bluetooth controller of a Bluetooth device scans for advertising data packets and how the Bluetooth controller stores data regarding the advertising packets in a memory of the Bluetooth controller.

For instance, the scan interval is 120 seconds. Therefore, the Bluetooth controller may scan for advertising packets every 120 seconds. Further, the scan window length is indicated as 100 milliseconds. Thus, for each interval, the Bluetooth controller may scan for advertising packets for a duration of 100 milliseconds. The scan discard rule indicates that, if the portion of the memory that is allocated for the batch-scan mode is full, the Bluetooth controller is configured to discard the data regarding the oldest advertising packet (i.e., the advertising packet having the earliest timestamp). The storage space parameter indicates what percentage of the memory is allocated to storing data regarding advertising packets using the truncated mode. Thus, the Bluetooth controller is configured to use 45% of the memory of the Bluetooth controller to store data in the truncated mode.

Further, the notification threshold indicates when the Bluetooth controller is configured to notify the host processor that the storage space is almost full. In other words, since the notification threshold in this example is 90%, the Bluetooth controller may be configured to send a notification to the host processor when 90% of the 45% of the memory allocated for use in the truncated mode is consumed.

Additionally, the scan request parameter indicates that when operating in the truncated mode, the Bluetooth controller is configured to not send scan requests in response to receiving an advertising packet. And finally, the data fields indicate the format of the record that the Bluetooth controller stores for received advertising packets. In this example, the Bluetooth controller is configured to store a device address, transmit power (of the advertising Bluetooth device), RSSI, and timestamp.

As shown in FIG. 5B, the second batch-scan mode may be a full mode. Like the truncated mode of FIG. 5A, the parameters of the full mode include a scan interval, scan window length, scan discard rule, storage space, notification threshold, scan request, and data fields. Specifically, the scan interval is 30 seconds. Therefore, the Bluetooth controller may scan for advertising packets every 30 seconds. Further, the scan window length is indicated as 100 milliseconds. Thus, for each interval, the Bluetooth controller may scan for advertising packets for a duration of 100 milliseconds.

The scan discard rule indicates that, if the portion of the memory that is allocated for the batch-scan mode is full, the Bluetooth controller is configured to discard the data regarding the advertising packet with the weakest RSSI. The storage space parameter indicates that the Bluetooth controller is configured to use 50% of the memory of the Bluetooth controller to store data in the truncated mode. Further, the notification threshold indicates that the Bluetooth controller is configured to send a notification to the host processor when 90% of the 50% of the memory allocated for use in the full mode is consumed. Additionally, the scan request parameter indicates that when operating in the full mode, the Bluetooth controller is configured to send a scan request in response to receiving an advertising packet. And finally, the data fields indicate that the Bluetooth controller is configured to store a device address, transmit power, RSSI, timestamp, advertising packet, and scan response packet.

Figure 6:
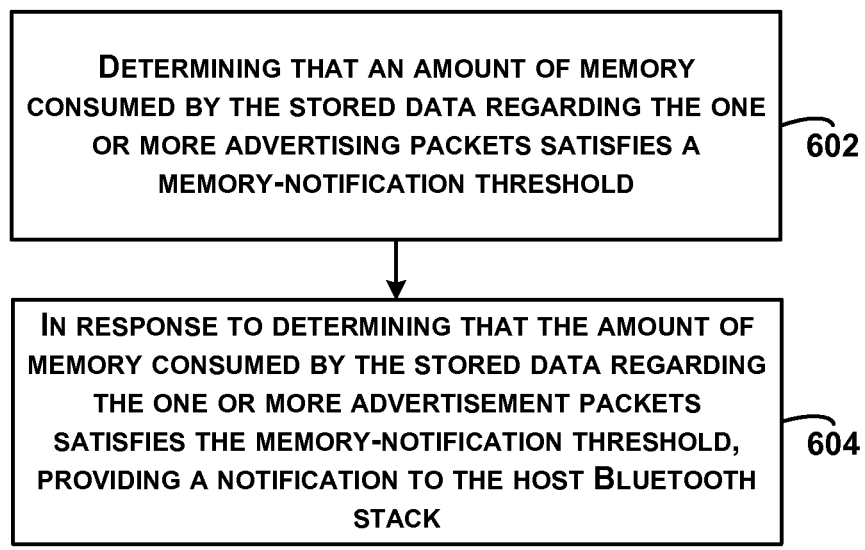
FIG. 6 is a flow chart depicting example functions that can be carried out in accordance with the present disclosure.

FIG. 6 is a flow chart depicting example functions that can be carried out in accordance with the present disclosure. More specifically, FIG. 6 depicts example functions that may be carried out by a Bluetooth controller to inform a host Bluetooth stack about the amount of data stored in a memory of the Bluetooth controller. The functions may be carried out by one or more processors of a Bluetooth controller of a Bluetooth device, such as one or more processors of the Bluetooth controller 202 of FIG. 2, and/or by one or more application processors. In some instances, the functions may be carried out in conjunction with one or more functions of the method 400 of FIG. 4.

As shown in FIG. 6, at block 602, the functions include determining that an amount of memory consumed by the stored data regarding the one or more advertising packets satisfies a memory-notification threshold. In line with the discussion above, the memory-notification threshold may be a percentage of memory consumed or remaining For instance, if the memory-notification threshold is 90% consumed, a Bluetooth controller may determine whether the amount of memory consumed by the stored data is greater than 90%. If the amount of memory consumed is greater than 90%, the Bluetooth controller may determine that the memory-notification threshold is satisfied. But if the amount of memory consumed is less than 90%, the Bluetooth controller may determine that the memory-notification threshold is not satisfied.

Alternatively, if the memory-notification threshold is 15% remaining, the Bluetooth controller may determine, based on the amount of memory consumed by the stored data, whether there is less than 15% of free memory available in the portion of memory allocated for storing data. For example, if the amount of free memory available is less than 15%, the Bluetooth controller may determine that the memory-notification threshold is satisfied. But if the amount of free memory available is greater than 15%, the Bluetooth controller may determine that the memory-notification threshold is not satisfied.

In one example, the Bluetooth controller may perform the function at block 602 once per scan interval. In another example, the Bluetooth controller may perform the function at block 602 whenever the Bluetooth controller adds new data to the memory.

Further, at block 604, the functions include, in response to determining that the amount of memory consumed by the stored data regarding the one or more advertising packets satisfies the memory-notification threshold, providing a notification to the host Bluetooth stack. In line with the discussion above, in one example, the Bluetooth controller may provide a notification to the host Bluetooth stack using an HCI. In some instances, the notification may prompt a host processor to wake up and send a read-request to the Bluetooth controller to retrieve the stored data.

Figure 7:
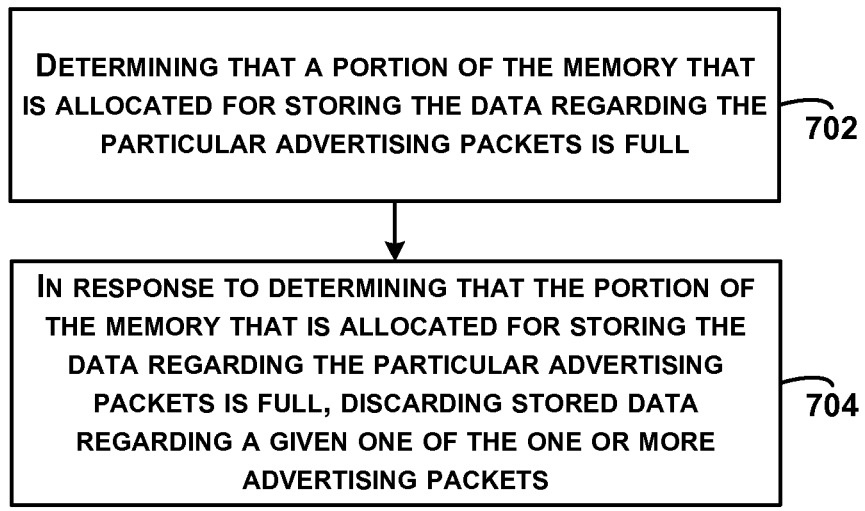
FIG. 7 is another flow chart depicting example functions that can be carried out in accordance with the present disclosure.

FIG. 7 is another flow chart depicting example functions that can be carried out in accordance with the present disclosure. More specifically, FIG. 7 depicts example functions that may be carried out to continue storing data regarding advertising packets without waking up a host processor even though a portion of memory allocated for storing data is full. The functions may be carried out by one or more processors of a Bluetooth controller of a Bluetooth device, such as the Bluetooth controller 202 of FIG. 2, and/or by one or more application processors. In some instances, the functions may be carried out in conjunction with one or more functions of the method 400 of FIG. 4.

As shown in FIG. 7, at block 702, the functions involve determining that a portion of the memory that is allocated for storing the data regarding the particular advertising packets is full. By way of example, a Bluetooth controller may be configured to use 85% of a memory to store data, and the Bluetooth controller may determine that 85% of the memory is full of stored data regarding advertising packets. At block 704, the functions then involve, in response to determining that the portion of the memory that is allocated for storing the data regarding the particular advertising packets is full, discarding stored data regarding a given one of the more advertising packets. In line with the discussion above, the Bluetooth controller may be configured to determine a given advertising packet having the earliest timestamp, and discard the stored data regarding the given advertising packet. Alternatively, the Bluetooth controller may be configured to determine a given advertising packet having the weakest RSSI, and discard the stored data regarding the given advertising packet. In some instances, discarding the stored data regarding the given advertising packet may enable the Bluetooth controller to store additional data regarding advertising packets without having to wake up a host processor which implements the host Bluetooth stack. This may enable the host processor to remain in idle mode or sleep mode for a longer duration, thereby conserving power of the Bluetooth device.

Figure 8:
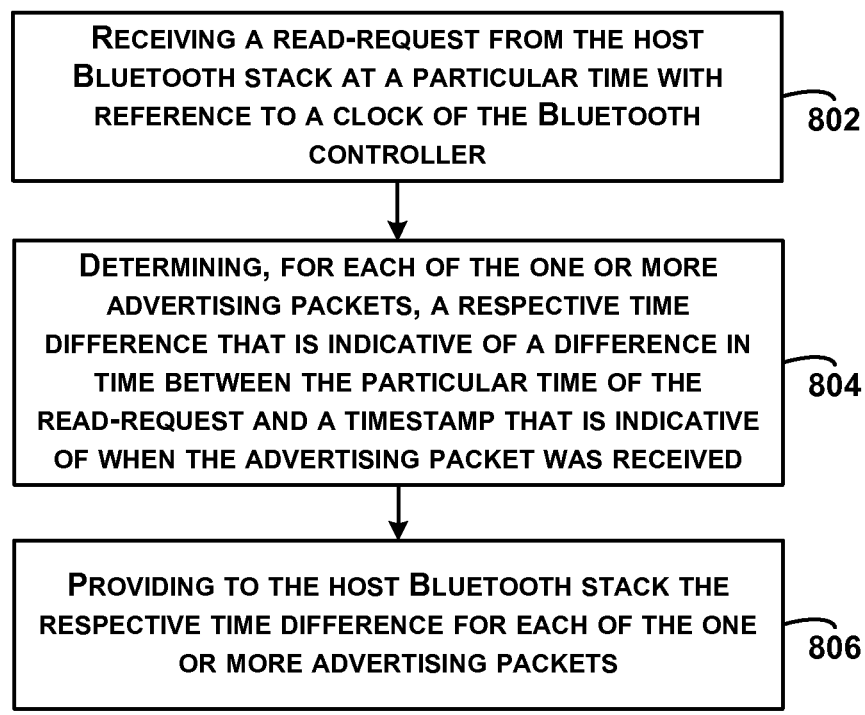
FIG. 8 is still another flow chart depicting example functions that can be carried out in accordance with the present disclosure.

FIG. 8 is still another flow chart depicting example functions that can be carried out in accordance with the present disclosure. More specifically, FIG. 8 depicts example functions that may be carried out by a Bluetooth controller to provide stored data to a host Bluetooth stack. The functions may be carried out by one or more processors of a Bluetooth controller of a Bluetooth device, such as the Bluetooth controller 202 of FIG. 2, and/or one or more application processors. In some instances, the functions may be carried out in conjunction with one or more functions of the method 400 of FIG. 4.

In one example, the Bluetooth controller and host Bluetooth stack may operate using two different clocks that are not synchronized. For instance, the Bluetooth controller may operate with reference to a clock of the Bluetooth controller, and the host Bluetooth stack may operate with reference to a clock of a separate host processor. When receiving advertising packets, the Bluetooth controller may timestamp the advertising packets with a timestamp that is defined with reference to the clock of the Bluetooth controller. In order to sync the timestamps determined by the Bluetooth controller with the clock of the host processor, the Bluetooth controller may carry out the functions of FIG. 8.

As shown in FIG. 8, at block 802, the functions include receiving a read-request from the host Bluetooth stack at a particular time with reference to a clock of the Bluetooth controller. For instance, the read-request may be received at a time "time_readRequest". Further, at block 804, the functions include determining, for each of the one or more advertising packets, a respective time difference that is indicative of a difference in time between the particular time of the read-request and a timestamp that is indicative of when the advertising packet was received. For example, if data stored in the memory indicates that a particular advertising packet was received at time "time_received", the Bluetooth controller may calculate a time difference of (time_readRequest—time_received). For instance, the time difference may be a number of milliseconds.

And at block 806, the functions include providing to the host Bluetooth stack the respective time difference for each of the one or more advertising packets. By way of example, the Bluetooth controller may replace the timestamp field for each record of stored data in the memory with the calculated time difference. In other words, the Bluetooth controller may replace time_received with the calculated time difference. Then the Bluetooth controller may provide the stored data to the host processor using an HCI. This may allow the host processor to calculate, with respect to a clock of the host processor, the time that each advertising packet was received.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
    determining parameters of at least one batch-scan mode for a short-range wireless device, wherein the parameters of the at least one batch-scan mode specify a format for storing data regarding particular advertising packets that are received by the short-range wireless device when operating in the at least one batch-scan mode;
    receiving, by the short-range wireless device, one or more advertising packets on an interval basis;

storing data regarding the one or more advertising packets into a memory of the short-range wireless device in accordance with the at least one batch-scan mode; and providing the stored data regarding the one or more advertising packets to a host stack.

2. The method of claim 1, wherein determining the parameters of the at least one batch-scan mode comprises receiving one or more commands for configuring the at least one batch-scan mode.

3. The method of claim 1, wherein the parameters of the at least one batch-scan mode further specify an interval period for scanning for advertising packets on one or more advertising channels.

4. The method of claim 1, wherein the parameters of the at least one batch-scan mode further specify a scan window length, wherein the scan window length specifies an amount of time per interval that the short-range wireless device scans for advertising packets on one or more advertising channels.

5. The method of claim 1, wherein parameters of the at least one batch-scan mode further specify (i) a portion of the memory that is allocated for storing the data regarding advertising packets that are received by the short-range wireless device, and (ii) a memory-notification threshold, and wherein the method further comprises:
determining that an amount of memory consumed by the stored data regarding the one or more advertising packets satisfies the memory-notification threshold; and
in response to determining that the amount of memory consumed by the stored data regarding the one or more advertising packets satisfies the memory-notification threshold, providing a notification to the host stack.

6. The method of claim 1, wherein the host stack is implemented by a host processor of the short-range wireless device, and wherein receiving the one or more advertising packets on the interval basis and storing the data regarding the one or more advertising packets are carried out by a controller of the short-range wireless device while the host processor is in an idle mode or a sleep mode.

7. The method of claim 1, further comprising:
determining that a portion of the memory that is allocated for storing the data regarding the particular advertising packets is full; and
in response to determining that the portion of the memory that is allocated for storing the data regarding the particular advertising packets is full, discarding stored data regarding a given one of the one or more advertising packets.

8. The method of claim 7, wherein the given advertising packet comprises an advertising packet selected from the group consisting of: an oldest advertising packet and an advertising packet having a weakest received signal strength indication (RSSI).

9. The method of claim 1, wherein the parameters of the at least one batch-scan mode further specify whether to perform a scan request in response to receiving an advertising packet.

10. The method of claim 1, further comprising receiving a read-request from the host stack, wherein providing the stored data regarding the one or more advertising packets occurs in response to receiving the read-request.

11. The method of claim 10:
wherein the read-request is received at a particular time with reference to a clock of a controller of the short-range wireless device,
wherein the stored data regarding the one or more advertising packets comprises, for each of the one or more advertising packets, a respective timestamp that is indicative of when the advertising packet is received with reference to the clock of the controller, and
wherein providing the stored data regarding the one or more advertising packets comprises providing, for each of the one or more advertising packets, a respective time difference that is indicative of a difference in time between the particular time and the timestamp.

12. The method of claim 1, wherein providing the stored data regarding the one or more advertising packets occurs over a host-controller interface (HCI).

13. The method of claim 1, wherein the at least one batch-scan mode comprises a truncated mode having a first format and a full mode having a second format that includes more data fields than the first format.

14. The method of claim 13:
wherein in the truncated mode the stored data regarding the one or more advertising packets comprises, for each of the one or more advertising packets, data indicative of a respective device address, respective transmit power, and respective received signal strength indication (RSSI), and
wherein in the full mode the stored data regarding the one or more advertising packets comprises for each of the one or more advertising packets, data indicative of a respective device address, respective transmit power, respective RSSI, and advertisement data of the advertising packet.

15. A short-range wireless device comprising:
one or more processors; and
a computer-readable medium, configured to store instructions, that when executed by the one or more processors of the short-range wireless device, cause the short-range wireless device to perform functions comprising:
determining parameters of at least one batch-scan mode, wherein the parameters of the at least one batch-scan mode specify a format for storing data regarding particular advertising packets that are received by the short-range wireless device when operating in the at least one batch-scan mode,
receiving one or more advertising packets on an interval basis,
storing data regarding the one or more advertising packets into a memory of the short-range wireless device in accordance with the at least one batch-scan mode, and
providing the stored data regarding the one or more advertising packets to a host stack.

16. The short-range wireless device of claim 15, wherein the parameters of the at least one batch-scan mode further specify whether to perform a scan request in response to receiving an advertising packet.

17. The short-range wireless device of claim 15, wherein the at least one batch-scan mode comprises a truncated mode having a first format and a full mode having a second format that includes more data fields than the first format.

18. A non-transitory computer-readable medium having stored therein instructions, that when executed by one or more processors of a short-range wireless device, cause the short-range wireless device to perform functions comprising:
determining parameters of at least one batch-scan mode, wherein the parameters of the at least one batch-scan mode specify a format for storing data regarding particular advertising packets that are received by the short-range wireless device when operating in the at least one batch-scan mode;

receiving one or more advertising packets on an interval basis;

storing data regarding the one or more advertising packets into a memory of the short-range wireless device in accordance with the at least one batch-scan mode; and providing the stored data regarding the one or more advertising packets to a host stack.

19. The non-transitory computer-readable medium of claim 18, wherein the parameters of the at least one batch-scan mode further specify whether to perform a scan request in response to receiving an advertising packet.

20. The non-transitory computer-readable medium of claim 18, wherein the at least one batch-scan mode comprises a truncated mode having a first format and a full mode having a second format that includes more data fields than the first format.

* * * * *